United States Patent [19]

Ellerstorfer

[11] 4,432,303
[45] Feb. 21, 1984

[54] BIRDBATH HOUSE

[76] Inventor: Herbert Ellerstorfer, Flurstrasse 18, Eckenhaid 8501, Fed. Rep. of Germany

[21] Appl. No.: 382,237

[22] Filed: May 26, 1982

[30] Foreign Application Priority Data

Jun. 3, 1981 [DE] Fed. Rep. of Germany ....... 8116459
Mar. 11, 1982 [DE] Fed. Rep. of Germany ....... 8206785

[51] Int. Cl.³ ...................... A01K 31/06; A01K 45/00
[52] U.S. Cl. ........................................ 119/17; 119/158
[58] Field of Search .................. 119/1, 17, 18, 19, 158

[56] References Cited

U.S. PATENT DOCUMENTS 1,455,105  5/1923  Butcher ................................. 119/19

FOREIGN PATENT DOCUMENTS 723071  2/1955  United Kingdom ................... 119/17
774557  5/1957  United Kingdom ................... 119/17

Primary Examiner—Hugh R. Chamblee
Attorney, Agent, or Firm—Holman & Stern

[57] ABSTRACT

A birdbath house has a front side with a pass-through opening, hooks on said front side for hanging the house on a cage and a roof part installed over a bath part. The roof part is easily removed from the bath part without separating the bath part from the cage by sliding it forward with guide grooves on both sides engaging a lip on both sides of the bath part. A catch or click-stop type device comprised of a catch recess and a catch projection is provided in the region of the guide groove and lip, and the hooks are located on the bath part, underneath the pass-through opening. The lip and guide groove extend in the transverse dimension outward to the side.

16 Claims, 7 Drawing Figures

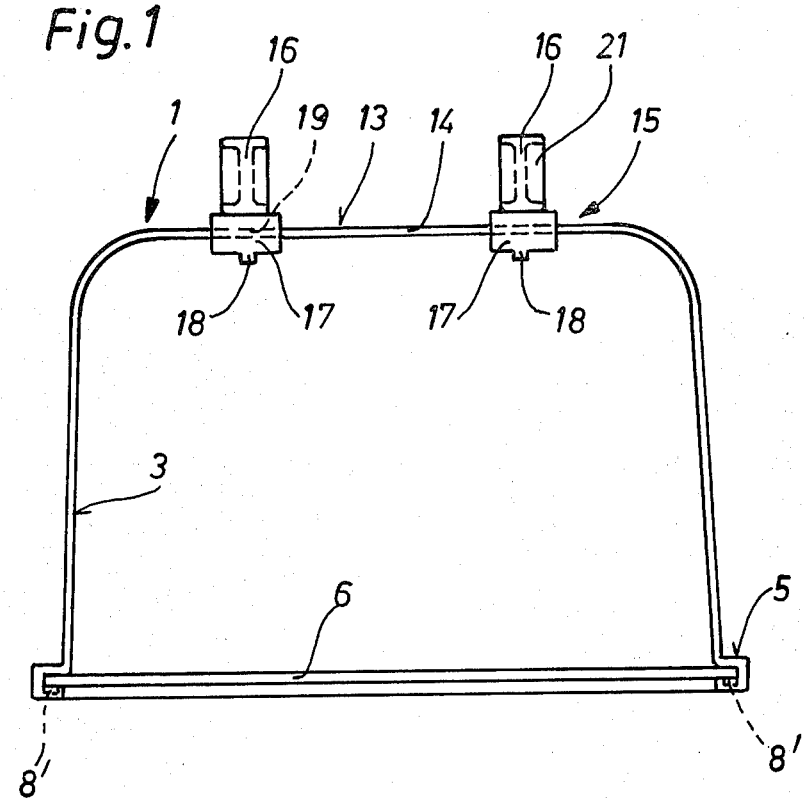
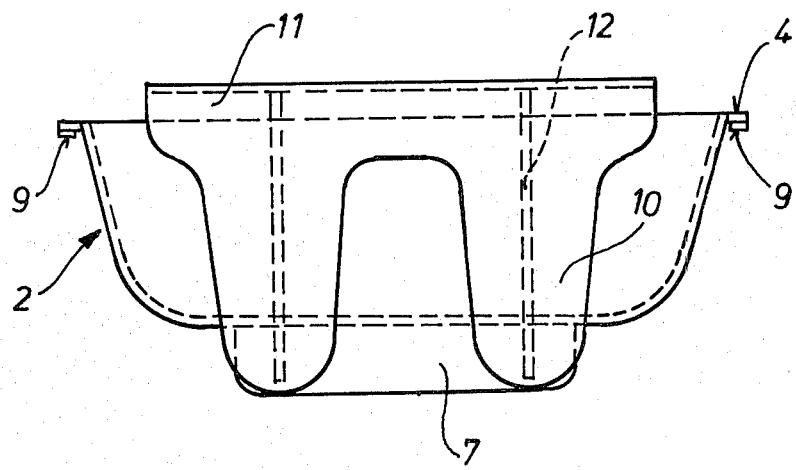

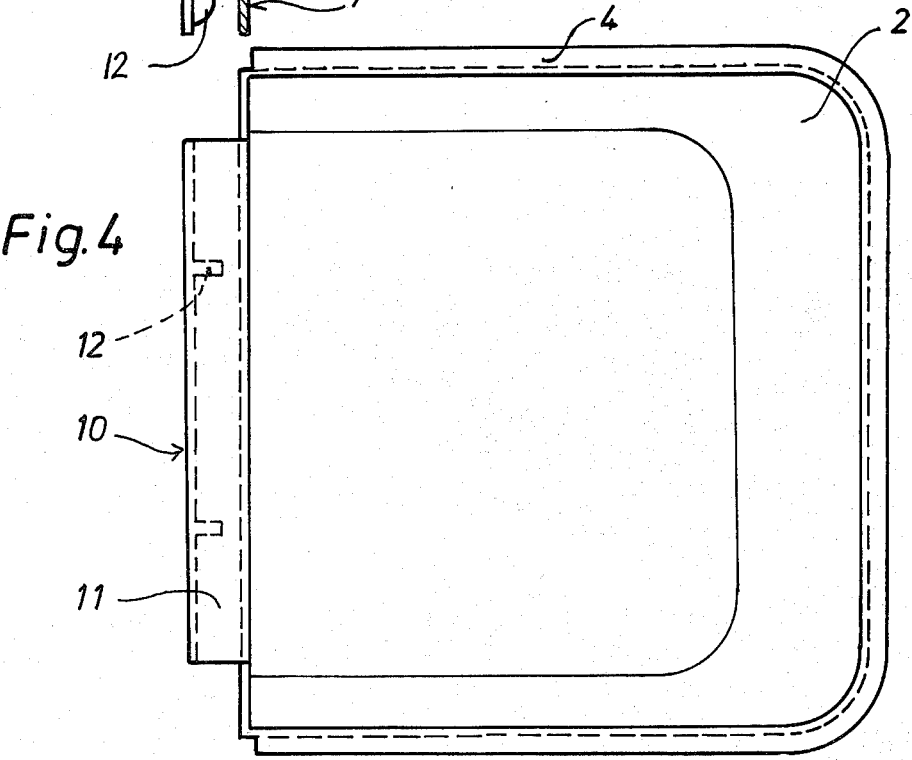

BIRDBATH HOUSE

FIELD OF THE INVENTION

The invention relates to a birdbath house which has a front side with a pass-through opening and hooks on said front side for hanging the house on a cage, and further has a roof part installed over a bath part.

DESCRIPTION OF THE PRIOR ART

In a known birdbath house of this type (Brit. Pat. No. 774,557) the hanging hooks are provided on the roof part, above the pass-through opening, a guide strip and the center plane of a guide groove run in the vertical direction, and projections, or detents of a catch or click-stop mechanism extend in the horizontal direction away from the inner side wall of the guide groove through perforations in the guide strip. With this construction the entire bath house must be separated from the cage in order to clean or otherwise service the bath part, and there are difficulties involved in pushing the rigid projections out of the catch recesses in order to remove the roof part from the bath part, because the catch mechanism is of a strong construction in order to be able to hold the bath part and roof part together in the face of tension in the vertical direction.

BRIEF SUMMARY OF THE INVENTION

An object of the invention is a birdbath house of the type described initially above wherein the roof part can be easily and simply removed from the bath part without removing the bath part from the cage. This object is achieved according to the invention by a birdbath house which is characterized in that the roof part is installed by sliding it forward, with its guide grooves on both sides engaging a guide strip on both sides of the bath part, a catch or click-stop type of mechanism, comprised of a catch recess and a projection, is provided in the region of the guide groove and guide strip, the hanging hooks are located on the bath part underneath the pass-through opening, the guide strip and guide groove extend in their transverse dimensions outward to the side, and the catch recess and catch projection are located on a flat side of the guide strip and a wall area of the guide groove, respectively (or vice versa), or on the outer face of the guide strip and a corresponding location on the base of the guide groove, respectively (or vice versa).

Since it is the bath part which is hung on the cage, it can be left there when the roof part is removed. The roof part can be removed without danger of breaking the hooks. The guide strip and guide groove hold the roof part and bath part together in the face of vertically applied tension tending to pull them apart, and they make it unnecessary for the catch arrangement to sustain this tension. Therefore, the catch mechanism can be made relatively light and easy-acting. The roof part is secured against unwanted removal, but it may be removed when desired without applying great force by merely manually disengaging the catch projections from the catch recess.

It is particularly advantageous if the upper edge of the bath part remains over its periphery at the level of the lower edge of the pass-through opening, and the bends of the hooks extend upward beyond the lower edge of the pass-through opening. With this arrangement the cage door can be closed as soon as the roof part of the birdbath house is removed from the bath part.

It is also particularly advantageous if the guide groove and guide strip extend in unbroken fashion over the two sides and back of the bath part and roof part. This contributes toward sealing the assembly against escaping water.

As a rule, the guide strip is attached to the bath part and the guide groove to the roof part. It is particularly advantageous if the walls of the roof part and the bath part are aligned flush with each other so as to present a substantially continuous surface on the inside of the bath house, and the channel which forms the guide groove extends outward in its transverse dimension from the wall of the roof part. With this feature the bird will not hit itself against any edges or projections in the bath.

In this connection, it is particularly advantageous for the recess of the catch arrangement to be in the guide strip and the catch projection to be at the base end of the guide groove, or for the catch projection to be on the guide strip and the recess to be on the wall of the guide groove. With this arrangement the catch projection and the catch mechanism as a whole can be expediently housed away from the bird.

It is further particularly advantageous if two catch arrangements are provided one on each side of the bath, near the front (the front being the part with the hooks). With this refinement, no catching action between the roof part and the bath part occurs until shortly before the conclusion of their assembly (which assembly is accomplished by sliding the roof part and bath part together); and it is particularly easy to disengage the catch mechanism when it is desired to remove the roof part.

In a particularly advantageous embodiment the hooks extend below the lower front edge of the bath part, and there is a support strip or bracket attached to the bath part and extending downward parallel to the hook. This improves the support of the bath part on the cage and reduces the hazard of breaking the hooks.

Ridges ("molding strips") may be provided which extend over the length of the hooks between the hooks and the bath part. These ridges reduce the open distance between the hook parts, hooks or ridges, and the front wall of the bath part, thereby improving the support of the bath part on the cage.

In this connection it is particularly advantageous for the exterior side of the bath part to be coated with a thin metallic coating, e.g., via plating. In this way the bath part, which is supported on the cage for extended periods, matches the appearance of the (usually metal) cage, and functions as a part of the cage.

In the known birdbath house of the type described initially supra (Brit. Pat. No. 774,557) the two hooks are tightly attached to the roof of the roof part, at a certain distance apart, so that they are integral with the roof. The distance between the hooks cannot be adjusted to changing cage conditions, and it is easy for them to come loose from the cage.

Accordingly, a second object of the invention is a birdbath house of the type described initially above wherein the support locations of the hooks on the roof of the roof part can be varied a substantial extent along its front edge, while the hooks are nonetheless held securely to the roof. This object is achieved according to the invention, by means characterized in that two hooks for hanging are provided on the roof of the roof part, on the front edge thereof which forms the boundary of the pass-through opening, each such hook is attached to a foot with a smooth clamping slot, whereby the foot is pushed over the edge of the roof and is held solely to the roof, by clamping, and the width of the clamping slot is a multiple of the thickness of the roof edge, i.e., a multiple of the thickness of the front edge of the roof matches the width of the clamping slot.

The arrangement whereby the hook is attached to the foot and the foot to the roof is an improvement which provides a much more secure connection. Further, each of the two hooks can be slid to a multitude of positions, and thus can be adjusted to changing cage conditions. The feet are not held by catch mechanisms having projections and recesses, but are held solely by clamping, e.g., with a set screw.

It is particularly advantageous if the front edge region of the roof is of uniform thickness over its entire length and breadth. Both hooks can be shifted to any position on the edge region of the roof.

It is also particularly advantageous if the hook is supported on top of the foot, i.e., is attached to a flat side of the foot. There the connection between hook and foot is more secure than it would be if the hook were attached to the front side of the foot.

It is further particularly advantageous if a stabilizing rib is provided on a flat side of the foot parallel to the clamping slot. This improves the sturdiness and the clamping of the foot.

In addition it is particularly advantageous if the clamping slot in the foot terminates in a slot configuration which is thicker and rounded. In this way stress concentrations are avoided which can lead to breaking in the event of violent stresses on the arms surrounding the clamping slot.

It is further particularly advantageous if the clamping surfaces of the clamping slot are slightly spherically convex. This facilitates putting the hookfoot in place on the roof of the roof part.

It is still further particularly advantageous if the hooks have a hollowed-out segment beginning near the foot and ending near the free hook end. This makes the hooks lighter without detracting from their strength.

BRIEF DESCRIPTION OF THE DRAWINGS

A preferred embodiment of the invention is illustrated in the drawings, wherein:

FIG. 1 is a front elevational view of a roof part of a birdbath house in accordance with the invention;

FIG. 2 is a front elevational view of the bath part of the bath house of FIG. 1;

FIG. 3 is a longitudinal cross-section of the bath house of FIGS. 1 and 2 when assembled;

FIG. 4 is a plan view of the bath part of FIG. 2;

DETAILED DESCRIPTION

Figure 5:
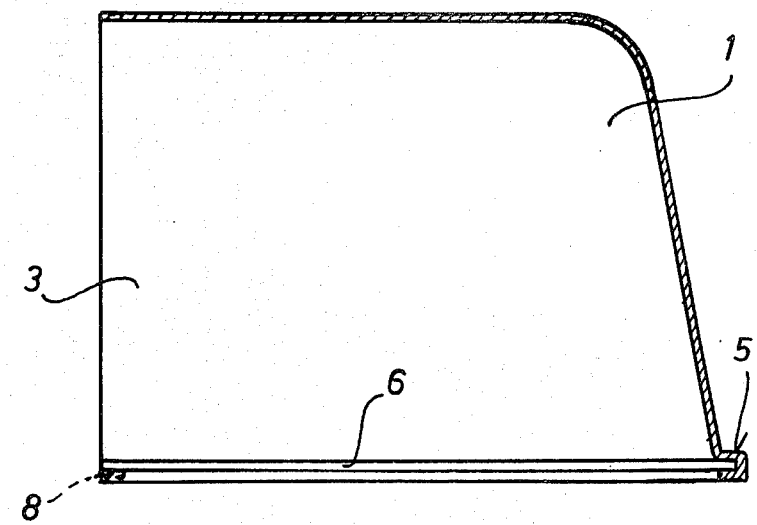
FIG. 5 is a longitudinal cross-section of the roof part of FIG. 1.

The birdbath house as shown in the drawings comprises two independent plastic parts, namely a roof part 1 and a bath part 2. Its shape in a horizontal cross-section is approximately rectangular. The bath part 2 is bounded over its periphery by walls of uniform height. There is a pass-through opening which is completely in the roof part, forming the front side of the roof part. The back sides of the roof part and wall part run at slight opposite angles to the vertical, so that the horizontal cross-sectional area of the bath house is maximum in the region where the roof part and bath part meet.

Figure 6:
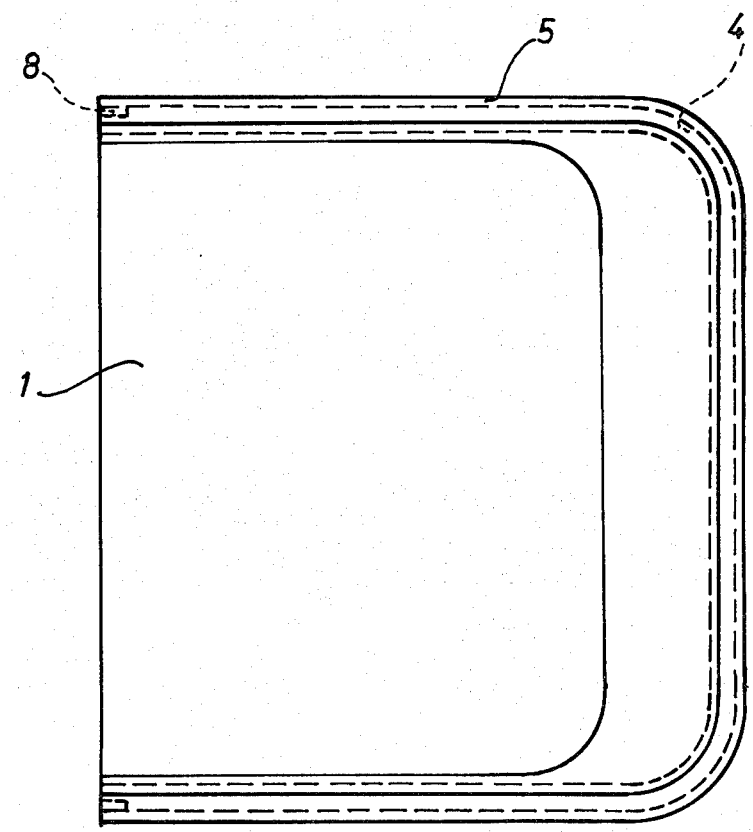
FIG. 6 is a plan view of the bath house of FIGS. 1 and 2.

The bath part 2 has a continuous guide strip 4 running on its upper edge along the two sides and back of the bath part, which guide strip is bent outward at about 90° to the walls of the bath part. The roof part 1 has a correspondingly running and outwardly bent channel 5 which forms a guide groove 6 into which the guide strip 4 is inserted by pushing (see FIGS. 3 and 6). The guide strip 4 fills the depth of guide groove 6, so that the assembly of the roof part and bath part is rigid.

Each side region of the guide strip 4 has a catch recess 8 close to its front end. The maximum depth or thickness of these recesses is half the depth or thickness of the projecting width of the strip. In the lower wall of the guide groove 6 near each of the two front ends there is a catch projection 9 (FIGS. 1 and 2). The catch projection is relatively short and flat, and also has rounded edges, whereby it can be relatively easily pulled back out of the catch recess, during which disengagement the side walls of the roof part 1 and the walls of the guide groove bend elastically.

On the front side of the bath part 2 there are two broad, tongue-shaped hooks 10 at a distance from each other, which merge at the top in a bending region 11. The bending region 11 is knurled, ridged, or fluted on its top surface, to provide a good grip for the bird on take-off and landing. The two hooks 10 extend to a considerable extent (e.g., one-fourth of their length) downward beyond the bottom of the bath part 2. A support strip or bracket 7 is provided on the bath part which runs parallel to the projecting part of the hooks, perpendicular to the bottom of the bath part, over the width of the front side of the bath part. On the inner side of each hook 10, in approximately the middle of the hook, there is a ridge 12.

The roof part 1 has on its top a roof or deck 13 of uniform thickness; in particular, the front edge region 14 is of uniform thickness. Two hooks 15, each comprised of a hook member 16 and a foot 17, are pushed on this front edge region 14 at a distance from each other. Each foot 17 is approximately rectangular, and has a reinforcing rib 18 running midway on its bottom surface in the direction in which it is pushed on i.e., front to back.

The foot 17 is divided in its middle horizontal plane by a clamping slot 19 which extends over the greater part of its dimension perpendicular to the edge region 14 i.e., the slot takes up most of the vertical dimension of the foot. However, this is not shown in FIG. 3. The edge region 14 is clamped in this clamping slot 19. When the foot is pulled off the edge region the thickness of this slot is less than the thickness of the edge region. The terminal end of the slot 19 is a thicker section 20 which is rounded and runs parallel to the front edge of the roof 13. The arms 17 which form the clamping slot 19, which are elastically bendable with respect to each other, have clamping surfaces which are spherically convex or rounded, which lie against the edge region 14 of the roof.

The foot 17 carries the hook member 16 on its top side. Hook member 16 is narrower than the foot in the direction parallel to the front roof edge. In the direction perpendicular to the roof edge, i.e., the front to back direction, the hook member extends approximately over the entire foot. The dimension of the hook member in this perpendicular direction decreases with distance upward from the foot, until the middle of the hook member is reached. There is a hollowed-out segment 21 on each side of the hook member 14, extending over nearly the entire length of the hook member.

The entire hook is made of a stiff, high strength, elastic plastic, such as an impact resistant or high impact polystyrene. The bath house has no accessories, electrical equipment, pumps, or other additions, and therefore is very light.

Figure 7:
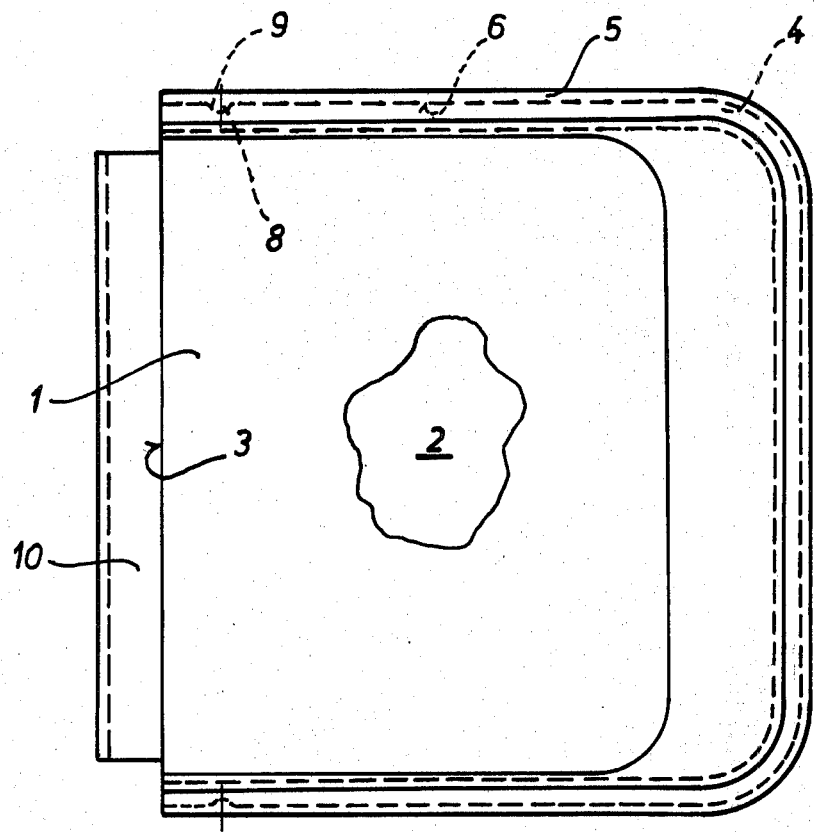
FIG. 7 is a plan view of a birdbath house of a slightly different embodiment of the invention than that of FIGS. 1 and 2.

In the embodiment of FIG. 7 the catch recess 8 is in the guide strip 4 and the catch projection 9 extends from the base of the guide groove 6. Both the catch projection 9 and the catch recess 8 are semicircular in shape.

I claim:

1. A birdbath house having a front side with a pass-through opening, hanging hooks on said front side for hanging the house on a cage, and a bowl shaped roof part installed over a bath part, comprising a lip along the lower part of the roof part, means defining a guide and support groove extending around the lip, the bath part is bowl shaped and has a flange type lip along its upper edge removably engaging said guide groove by sliding engagement therein in a direction transverse to the front side, a catch device for releasably retaining said bath part lip in said guide groove comprising at least one cooperating catch recess and projection provided between said guide groove and said bath part lip positioned near the front side to interengage when assembled, said recess and projection having rounded corners and said recess not penetrating through the member on which it is located, the hanging hooks being located on the bath part underneath the pass-through opening, and said bath part lip and said guide groove extend in their transverse dimension outwardly to the side.

2. A birdbath house according to claim 1, wherein the upper edge of the bath part is situated when assembled over its periphery at the vertical level of the lower edge of the pass-through opening, and the bend of each hook extends upward beyond the lower edge of the pass-through opening.

3. A birdbath house according to claim 1, wherein said roof part and bath part are substantially rectangular in shape and said guide groove and bath part lip extend in unbroken fashion over the two sides and back of the bath part and roof part.

4. A birdbath house according to claim 1, wherein the side walls of the roof part and the bath part when assembled are aligned substantially flush with each other so as to present a substantially continuous surface on the interior of the bath house, and the guide groove and bath part lip extend outwardly in a transverse direction from the wall of the roof part and the bath part respectively.

5. A birdbath house according to claim 1, wherein said catch recess of the catch device is in the bottom of the guide groove and the catch projection is on the bottom surface of the bath part lip.

6. A birdbath house according to claim 1, wherein the catch projection is on the guide strip and the catch recess is on the wall of the guide groove.

7. A birdbath house according to claim 1, wherein two catch mechanisms are provided, one on each side of the bath, near the front.

8. A birdbath house according to claim 1, wherein the hooks extend below the lower front edge of the bath part, and there is a support strip or bracket attached to the bath part and extending downwardly parallel to the hooks.

9. A birdbath house according to any one of claims 1 through 8, wherein the exterior of the bath part is coated with a thin metallic coating.

10. A birdbath house according to claim 1, and further comprising two top hooks for hanging are provided on the front edge of said roof part which forms the boundary of the pass-through opening, each top hook having a foot provided with a smooth clamping slot, whereby the foot is pushed over the edge of the roof and is held to the roof solely by clamping, and the opening of the clamping slot is slightly less than the thickness of the roof edge.

11. A birdbath house according to claim 10, wherein the front edge region of the roof is of uniform thickness over its entire length and breadth.

12. A birdbath house according to claim 10 or 11, wherein the foot of each top hook has a flat horizontal top surface and each top hook is mounted on said horizontal flat surface.

13. A birdbath house according to claim 10 or 11, wherein a stabilizing rib is provided on the lower side of each foot parallel to the clamping slot.

14. A birdbath house according to one of claims 10 or 11, wherein the clamping slot in the foot terminates in a larger slot section which is rounded.

15. A birdbath house according to one of claims 10 or 11, wherein the clamping surfaces of the clamping slot are slightly spherically convex.

16. A birdbath house according to one of claims 10 or 11, wherein each hook has a hollowed-out segment beginning near the foot and ending near the free hook end.

* * * * *